United States Patent [19]

Bitsch et al.

[11] Patent Number: 5,156,069
[45] Date of Patent: Oct. 20, 1992

[54] TRANSMISSION BOX

[75] Inventors: Harald Bitsch, Witten; Frank Kratzke, Castrop-Rauxel, both of Fed. Rep. of Germany

[73] Assignee: Mannesmann Aktiengesellschaft, Düsseldorf, Fed. Rep. of Germany

[21] Appl. No.: 742,905

[22] Filed: Aug. 9, 1991

[30] Foreign Application Priority Data

Aug. 9, 1990 [DE] Fed. Rep. of Germany ....... 4025505

[51] Int. Cl.⁵ .............................................. F16H 1/12
[52] U.S. Cl. ................................. 74/606 R; 74/421 A; 384/441
[58] Field of Search ..................... 74/421 A, 606 R; 384/441

[56] References Cited

U.S. PATENT DOCUMENTS 4,074,584 2/1978 Bushnell ........................... 74/421 A

FOREIGN PATENT DOCUMENTS 053015681 7/1981 Fed. Rep. of Germany.

Primary Examiner—Richard Lorence
Assistant Examiner—William O. Trousdell
Attorney, Agent, or Firm—Horst M. Kasper

[57] ABSTRACT

A transmission box with several bearings for shafts is disclosed. The transmission case (1) is produced by a plastic injection molded cast and comprises at least in part outer races (14) for the bearings (13), which are retained at a defined axial distance by a metallic precision insertion part (8) embedded into the plastic injection mold case (1).

20 Claims, 2 Drawing Sheets

TRANSMISSION BOX

BACKGROUND OF THE INVENTION

1. Field of the Invention

The invention relates to a gear transmission box with several bearings for shafts.

2. Brief Description of the Background of the Invention Including Prior Art

Such a gear box is known from the German Printed Patent Document Laid Open DE-OS 3 015 681 and is produced in a conventional fashion from steel. The processing of the transmission box, formed of two box casing halves at a partition line, and the precise arrangement of the bearings is very expensive. In addition, the box casing for the transmission is unnecessarily heavy.

SUMMARY OF THE INVENTION

1. Purposes of the Invention

It is an object of the present invention to provide a transmission box which can be produced with low production expenditures.

It is another object of the present invention to provide a transmission box which is noise damping.

It is yet a further object of the present invention to provide a transmission box which reliably supports the heavy shafts.

These and other objects and advantages of the present invention will become evident from the description which follows.

2. Brief Description of the Invention

The present invention provides for a transmission box. The transmission box comprises a plurality of bearings for shafts. A transmission case is made by injection molding of plastic. The transmission case at least in part surrounds outer races of the bearings. A metallic precision insertion part is embedded into the transmission case at a defined axial distance supporting the outer races of the bearings.

The transmission case can be produced of a fiber reinforced plastic material. The fiber reinforced plastic can exhibit substantially the same thermal expansion coefficient as the metallic precision insertion part. The metallic precision insertion part can be furnished with precision boreholes for the outer races of the bearings and with a center borehole for a motor flange. The metallic precision insertion part can be furnished with plastic compound break-outs.

Insertion mold nuts accessible from the outside of the transmission case can protrude into the plastic compound break-outs.

The transmission case can comprise two case halves. The case halves of the transmission case can be permanently connected to each other at a partition line. A projection on a first case half and a recess on a second case half can be engaged each other along the partition line.

Pins can be attached to a first one of the case halves. The case halves of the transmission case can be centered relative to each other via said pins protruding into recesses furnished in a second one of the case halves. The pins can be furnished with center bores for screw bolts.

The transmission case can comprise two case halves. The case halves of the transmission case can be permanently connected to each other at a partition line. The case halves can be connected to each other at the partition line sealed against oil by way of a seal.

The transmission case can be furnished with a plug gearing engagement as a torque support on the side disposed opposite to a motor, and coaxially to a drive shaft of the transmission.

The two metallic precision insertion parts can be disposed parallel to each other in the transmission case. The two metallic precision insertion parts can have boreholes disposed on a joint axis and wherein the axial misalignment of the position of the boreholes is less than 0.001 m.

An angle formed between the two metallic precision part planes can be less than 0.0001 arc.

The transmission box is produced according to the invention of injection molded plastic. The transmission box surrounds, at least in part, the outer rings of the bearings. The bearings are supported at an axial distance by at least one metallic precision insertion part in the injection molded plastic transmission box.

The transmission box itself is made of an ecomomic plastic material and the precise disposition of the bearings, with a tolerance of ±0.015 mm to 0.02 mm is assured by the precision insertion part. This precision is a base condition for a high specific load of the individual transmission parts and can be achieved by the combination of the plastic transmission box including roller bearings injection molded into the box and the metallic precision insertion parts, which precision insertion parts can be produced in a simple manner. This construction necessarily opposes the shrinking which is necessarily associated with injection-molded plastic parts. The plastic transmission case also dampens the transmission noises.

The extremely high specific load of the individual transmission parts requires both for the production of the gear teeth as well as for the mortise axes a precision machining in the region of the qualities IT 5 through IT 6. For this purpose, predominantly numerically controlled tool machines (NC-tool machines) and computerized numerically controlled tool machines (CNC-tool machines) are used. These machines can for example, produce the mortise axes and the roller bearing seats of the transmission box in a required tolerance of ±0.015 mm to 0.02 mm. This precision is a precondition for a good contact reflection in the longitudinal direction of the gear teeth and thus for an unequivocally high, specific use of the hardened and the ground gearing made of implant steel, for example, 15 CrNi 6.

Since the thermal expansion coefficient of the fiber-reinforced plastic corresponds substantially to that of the metallic precision insertion part, it is assured that negligiable internal tensions in the compound metal/plastic occur based on the cooling from the injection molding process, where the injection molding process occurs at a temperature of about 300° C., where such internal tensions could negatively influence the precision and, respectively, the loadability of the transmission box. The precision insertion part is preheated to the processing temperature of the plastic material. After the cooling of the parts of the transmission box, the required tolerance of 0.015 to 0.02 mm is achieved. The stability of the box is increased by additional punch-outs and stamp-outs, which are filled with the plastic during the injection process.

The high effect of advantage of the invention transmission box results from the direct injection molding around the roller bearing outer rings such that an expensive bearing seat machining and an axial securing of the bearings can be dispensed with and from a substantially planar shape of the metallic precision insertion parts. The metallic precision insertion parts can be spindled in a stack of about 50 pieces in one set or, respectively, can be ground by way of reamers in case of an assumed sheet metal thickness of 2 mm.

According to a further embodiment of the invention, the gear transmission box is produced of a fiber-reinforced plastic. In addition to precision boreholes for the outer rings of the bearings, the precision insertion part can also exhibit a motor flange as well as plastic compound break-outs for the plastic material, where mold nuts can protrude into the compound plastic break-outs. The box halves of the transmission box can be connected permanently to each other at a partition, whereby the otherwise usual standard mechanical surface sealing processing together with possibly screw connections can be eliminated. The box halves can be furnished with projections and recesses and can thereby be connected to each other, wherein the connection can be secured by way of welding or adhesive attachment. It is further possible however, to provide screw connection where the box halves are centered relative to each other via pins protruding through the corresponding boreholes.

According to a further embodiment of the invention, the transmission box can have a plug teeth engagement furnishing a torque support coaxially to a driver shaft of the gear on the side disposed opposite to the motor. The torque support allows to transfer the driving torque of the gear box without lateral force and without shearing force to the parts to be driven.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
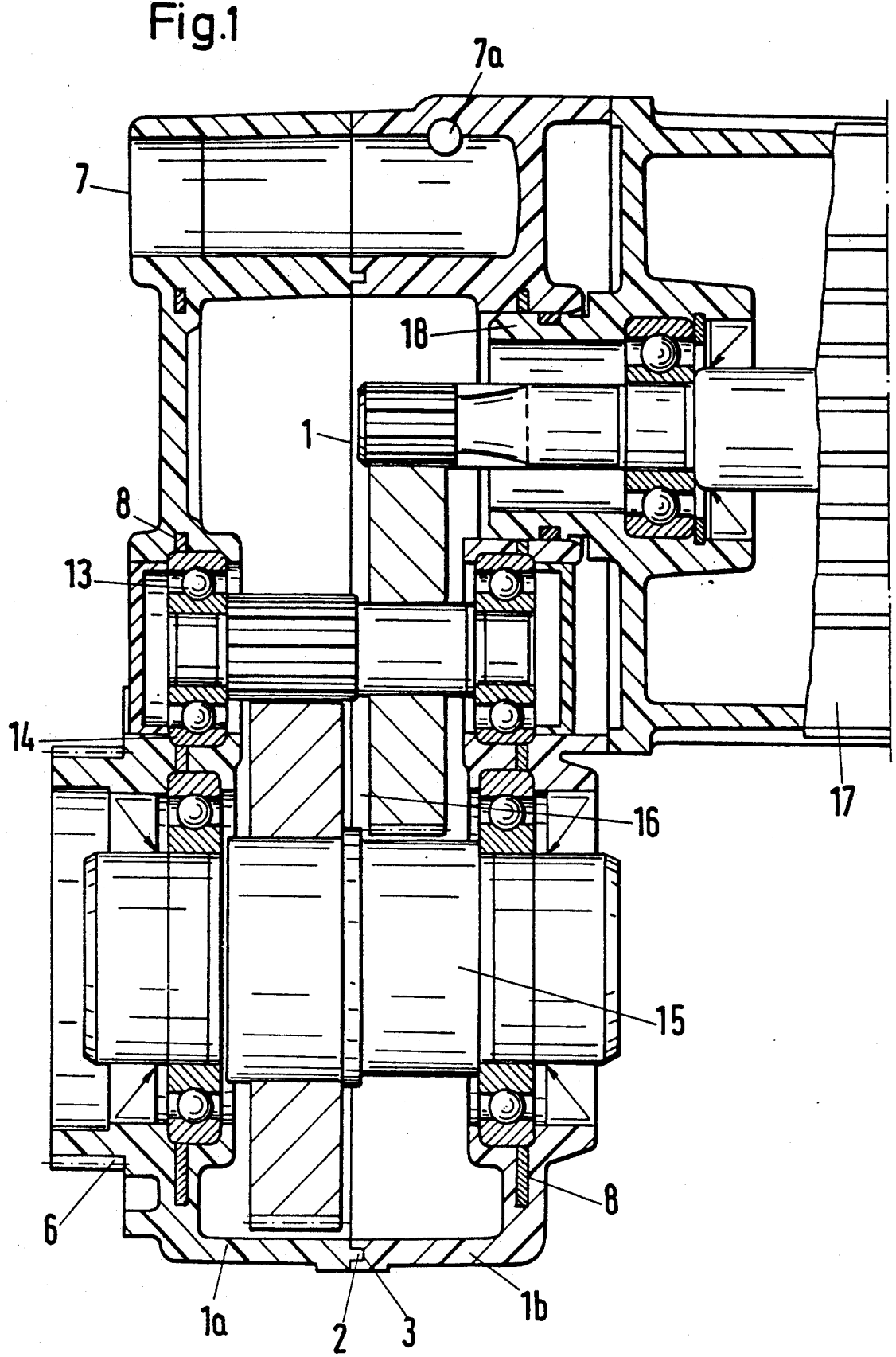
FIG. 1 is a cross-sectional view through a transmission box.

According to the present invention there is provided for a transmission box with several bearings for shafts. The transmission case 1 is made by injection molding of plastic. The transmission case 1 at least in part surrounds outer races 14 of the bearings 13. The outer races 14 of the bearings 13 are supported by at least one metallic precision insertion part embedded into the transmission case 1 at a defined axial distance.

The transmission case 1 can be produced of a fiber reinforced plastic material. The fiber reinforced plastic can exhibit nearly the same thermal expansion coefficient as the metallic precision insertion part 8. The metallic precision insertion part 8 can be furnished in addition to precision boreholes 9 for the outer races 14 of the bearings 13 also with a center borehole 10 for a motor flange 18. The metallic precision insertion part 8 can be as furnished with plastic compound break-outs 11. Additional insertion mold nuts 19 accessible from the outside of the transmission case 1 can protrude into the compound plastic break-outs 11.

The transmission case can comprise two case halves 1a, 1b. The case halves 1a, 1b of the transmission case 1 can be permanently connected to each other at a partition wall. The partition wall can be formed by a projection 2 and a recess 3. The case halves 1a, 1b of the transmission case 1 can be centered relative to each other via pins 5 attached to a first half 1a protruding into recesses 4 furnished in a second half 1b. The pins 5 can be furnished with center bores 5a for screw bolts 20.

The case halves 1a, 1b can be connected to each other at the partition wall sealed against oil by way of a seal 12. The transmission case 1 can be furnished with a plug gearing engagement 6 as a torque support on the side disposed opposite to the motor 17, and coaxially to a drive shaft 15 of the transmission 16.

The two metallic precision insertion parts can be disposed parallel to each other in the transmission case 1. The two metallic precision insertion parts can have boreholes disposed on a joint axis. The axial misalignment of the positions of the boreholes can be than 0.001 m. An angle formed between the two metallic precision part planes can be less than 0.0001 arc.

The transmission box 1 comprises case halves 1a and 1b. The case halves 1a and 1b are connected to each other, according to the embodiment of FIG. 1, via a projection 2 protruding into a recess 3. The connection can be additionally secured by way of welding or adhesive attachment.

A motor 17 with a motor flange 18 is attached at the gear transmission case 1. A drive shaft of the motor 17 is led to the transmission 16 via motor flange 18. The driven shaft 15 of the transmission 16 leads through a plug gear connection 6, serving as a torque support, of the transmission case 1, to the parts to be driven. A torque support can also be inserted into a torque support borehole 7 of the transmission case and can be secured in an adapter sleeve borehole 7a containing an adapter sleeve.

Figure 2:
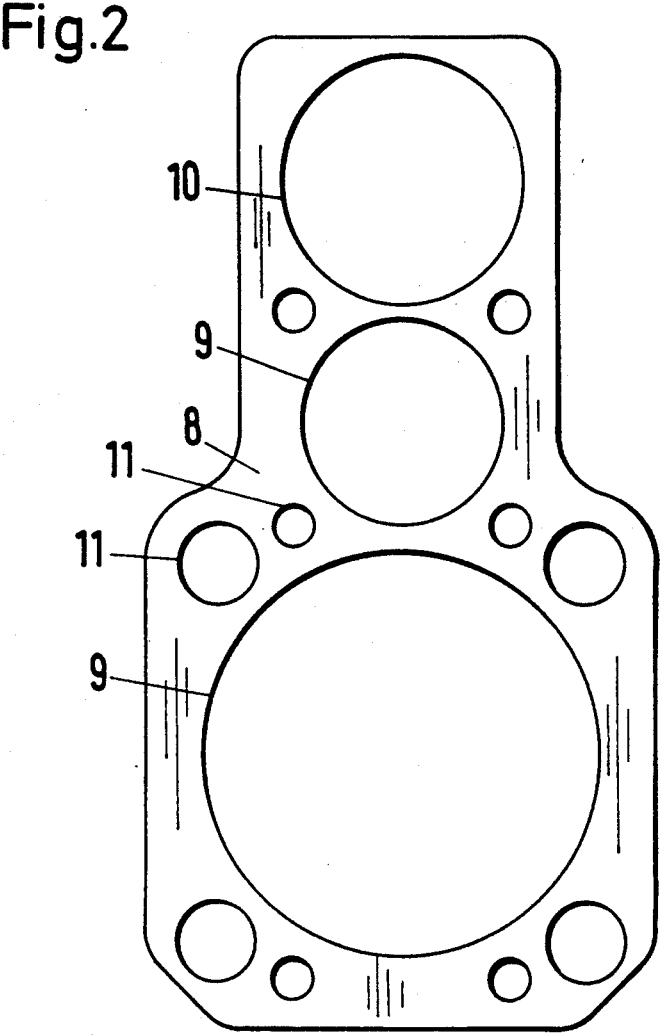
FIG. 2 is a precision insertion part illustrated at a smaller scale.

All shafts of the transmission 16 are supported in bearings 13. The outer races 14 of the bearings 13 are embedded into the transmission case 1 made of plastic material. The outer races 14 are maintained at an exact distance during the production and later during operation held by precision boreholes 9 of the precision insertion parts 8, injection molded into the plastic. The precision parts 8 are properly positioned prior to the injection molding process. In addition, the motor flange 18 leads through a center borehole 10 of the precision insertion part 8, which is illustrated in FIG. 2 in an elevational view.

Figure 3:
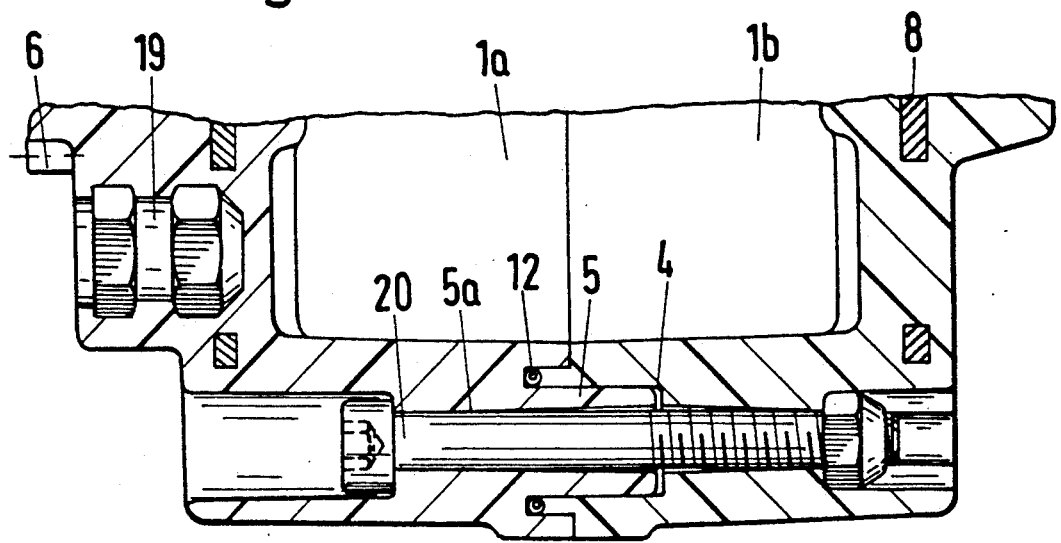
FIG. 3 is a further connection possibility for the halves of the box.

Two precision boreholes 9 for the outer rings 14 of the bearings 13 are furnished in addition to the center borehole 10 for the motor flange 18 as well as plastic compound break-outs 11, wherein injection mold nuts 19 can protrude into the larger plastic compound break-outs 11, as can be recognized in FIG. 3.

The case halves 1a and 1b are centered relative to each other via pins 5 protruding into recesses 4 according to the embodiment of FIG. 3. Center bores 5a pass through the pins 5 and the following case half 1b, where screw bolts 20 are led through the center bores 5a for holding the case halves 1a and 1b together. A seal 12 is inserted into the partition. It can be further recognized from FIG. 3, that the plastic material structure is connected to each other on two sides of the precision insertion part 8 in the region of the plastic compound break-outs 11. Mold nuts 19 protrude into these plastic compound break-outs 11, where the mold nuts 19 serve for the attachment of the transmission box to other construction parts of a machine.

It will be understood that each of the elements described above, or two or more together, may also find a useful application in other types of gear boxes differing from the types described above.

While the invention has been illustrated and described as embodied in the context of a gear transmission box with several bearings for shafts, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A transmission box comprising
a plurality of bearings for shafts;
outer races of the bearings;
a transmission case made by injection molding of plastic, and wherein the transmission case at least in part surrounds outer races of the bearings;
a metallic precision insertion part embedded into the transmission case at a defined axial distance wherein the metallic precision insertion part is furnished with a plurality of precision bores for supporting the outer races of the bearings.

2. The transmission box according to claim 1, wherein the transmission case is produced of a fiber reinforced plastic material.

3. The transmission box according to claim 2, wherein the fiber reinforced plastic exhibits substantially the same thermal expansion coefficient as the metallic precision insertion part.

4. The transmission box according to claim 1, wherein the transmission case comprises two case halves and wherein the case halves of the transmission case are permanently connected to each other at a partition line.

5. The transmission box according to claim 4, further comprising projection on a first case half and a recess on a second case half engaging each other along the partition line.

6. The transmission box according to claim 1, wherein the transmission case comprises two case halves, wherein the case halves of the transmission case are permanently connected to each other at a partition line;
wherein the case halves are connected to each other at the partition line sealed against oil by way of a seal.

7. A transmission box comprising
a plurality of bearings for shafts;
outer races of the bearings;
a transmission case made by injection molding of plastic, and wherein the transmission case at least in part surrounds outer races of the bearings;
a metallic precision insertion part embedded into the transmission case at a defined axial distance supporting the outer races of the bearings, wherein the metallic precision insertion part is furnished with precision boreholes for the outer races of the bearings and with a center borehole for a motor flange.

8. A transmission box comprising
a plurality of bearings for shafts;
outer races of the bearings;
a transmission case made by injection molding of plastic, and wherein the transmission case at least in part surrounds outer races of the bearings;
a metallic precision insertion part embedded into the transmission case at a defined axial distance supporting the outer races of the bearings, wherein the metallic precision insertion part is furnished with plastic compound break-outs.

9. The transmission box according to claim 8 further comprising
insertion mold nuts accessible from the outside of the transmission case protruding into the plastic compound break-outs.

10. A transmission box comprising
a plurality of bearings for shafts;
outer races of the bearings;
a transmission case made by injection molding of plastic, and wherein the transmission case at least in part surrounds outer races of the bearings;
a metallic precision insertion part embedded into the transmission case at a defined axial distance supporting the outer races of the bearings;
wherein the transmission case comprises two case halves and wherein the case halves of the transmission case are permanently connected to each other at a partition line;
pins attached to a first one of the case halves, wherein the case halves of the transmission case are centered relative to each other via said pins protruding into recesses furnished in a second one of the case halves.

11. The transmission according to claim 10, wherein the pins are furnished with center bores for screw bolts.

12. A transmission box comprising
a plurality of bearings for shafts;
outer races of the bearings;
a transmission case made by injection molding of plastic, and wherein the transmission case at least in part surrounds outer races of the bearings;
a metallic precision insertion part embedded into the transmission case at a defined axial distance supporting the outer races of the bearings, wherein the transmission case is furnished with a plug gearing engagement as a torque support on the side disposed opposite to a motor, and coaxially to a drive shaft of the transmission.

13. A transmission box comprising
a plurality of bearings for shafts;
outer races of the bearings;
a transmission case made by injection molding of plastic, and wherein the transmission case at least in part surrounds outer races of the bearings;
a metallic precision insertion part embedded into the transmission case at a defined axial distance supporting the outer races of the bearings;
a metallic precision insertion part embedded into the transmission case at a defined axial distance supporting the outer races of the bearings, wherein the transmission case comprises two case halves, wherein the case halves of the transmission case are permanently connected to each other at a partition line; and wherein two metallic precision insertion parts are disposed parallel to each other in the transmission case.

14. A transmission box comprising
a plurality of bearings for shafts;
outer races of the bearings;
a transmission case made by injection molding of plastic, and wherein the transmission case at least in part surrounds outer races of the bearings;
a metallic precision insertion part embedded into the transmission case at a defined axial distance supporting the outer races of the bearings, wherein the transmission case comprises two case halves, wherein the case halves of the transmission case are permanently connected to each other at a partition line;
wherein two metallic precision insertion parts have boreholes disposed on a joint axis and wherein the axial misalignment of the position of the boreholes is less than 0.001 m.

15. A transmission box comprising
a plurality of bearings for shafts;
outer races of the bearings;
a transmission case made by injection molding of plastic, and wherein the transmission case at least in part surrounds outer races of the bearings;
a metallic precision insertion part embedded into the transmission case at a defined axial distance supporting the outer races of the bearings, wherein the transmission case comprises two case halves, wherein the case halves of the transmission case are permanently connected to each other at a partition line;
wherein the angle formed between two metallic precision part planes is less than 0.0001 arc.

16. A transmission box with several bearings for shafts, wherein the transmission case (1) is made by injection molding of plastic, and wherein the transmission case (1) at least in part surrounds outer races (14) of the bearings (13), wherein the outer races (14) of the bearings (13) are supported by at least one metallic precision insertion part furnished with a plurality of precision bores furnished for receiving a plurality of outer races embedded into the transmission case (1) at a defined axial distance.

17. A transmission box with several bearings for shafts, wherein the transmission case (1) is made by injection molding of plastic, and wherein the transmission case (1) at least in part surrounds outer races (14) of the bearings (13), wherein the outer races (14) of the bearings (13) are supported by at least one metallic precision insertion part embedded into the transmission case (1) at a defined axial distance;
wherein the transmission case (1) is produced of a fiber reinforced plastic material;
wherein the fiber reinforced plastic exhibits nearly the same thermal expansion coefficient as the metallic precision insertion part (8);
wherein the metallic precision insertion part (8) is furnished in addition to precision boreholes (9) for the outer races (14) of the bearings (13) also with a center borehole (10) for a motor flange (18);
wherein the metallic precision insertion part (8) is furnished with plastic compound break-outs (11);
and wherein additional insertion mold nuts (19) accessible from the outside of the transmission case (1) protrude into the compound plastic break-outs (11).

18. A transmission box with several bearings for shafts, wherein the transmission case (1) is made by injection molding of plastic, and wherein the transmission case (1) at least in part surrounds outer races (14) of the bearings (13), wherein the outer races (14) of the bearings (13) are supported by at least one metallic precision insertion part embedded into the transmission case (1) at a defined axial distance, wherein the transmission case comprises two case halves (1a, 1b), wherein the case halves (1a,1b) of the transmission case are permanently connected to each other at a partition wall;
wherein the partition wall is formed by a projection (2) and a recess (3);
wherein the case halves (1a,1b) of the transmission case (1) are centered relative to each other via pins (5) attached at a first half (1a) protruding into recesses (4) furnished in a second half (1b); and
wherein the pins (5) are furnished with center bores (5a) for screw bolts (20).

19. A transmission box with several bearings for shafts, wherein the transmission case (1) is made by injection molding of plastic, and wherein the transmission case (1) at least in part surrounds outer races (14) of the bearings (13), wherein the outer races (14) of the bearings (13) are supported by at least one metallic precision insertion part embedded into the transmission case (1) at a defined axial distance, wherein the transmission case (1) comprises two case halves (1a, 1b), wherein the case halves (1a,1b) of the transmission case are permanently connected to each other at a partition wall;
wherein the case halves (1a,1b) are connected to each other at the partition wall sealed against oil by way of a seal (12); and
wherein the transmission case (1) is furnished with a plug gearing engagement (6) as a torque support on the side disposed opposite to a motor (17), and coaxially to a drive shaft (15) of the transmission (16).

20. A transmission box with several bearings for shafts, wherein the transmission case (1) is made by injection molding of plastic, and wherein the transmission case (1) at least in part surrounds outer races (14) of the bearings (13), wherein the outer races (14) of the bearings (13) are supported by at least one metallic precision insertion part embedded into the transmission case (1) at a defined axial distance, wherein the transmission case (1) comprises two case halves (1a, 1b), wherein the case halves (1a,1b) of the transmission case are permanently connected to each other at a partition wall;
wherein two metallic precision insertion parts are disposed parallel to each other in the transmission case (10);
wherein the two metallic precision insertion parts have boreholes disposed on a joint axis and wherein the axial misalignment of the position of the boreholes is less than 0.001 m; and
wherein an angle formed between the two metallic precision part planes is less than 0.0001 arc.

* * * * *